March 3, 1970   J. A. COON ET AL   3,498,671
MOVABLE HEADREST FOR VEHICLE SEATS
Filed Feb. 28, 1968   2 Sheets-Sheet 1
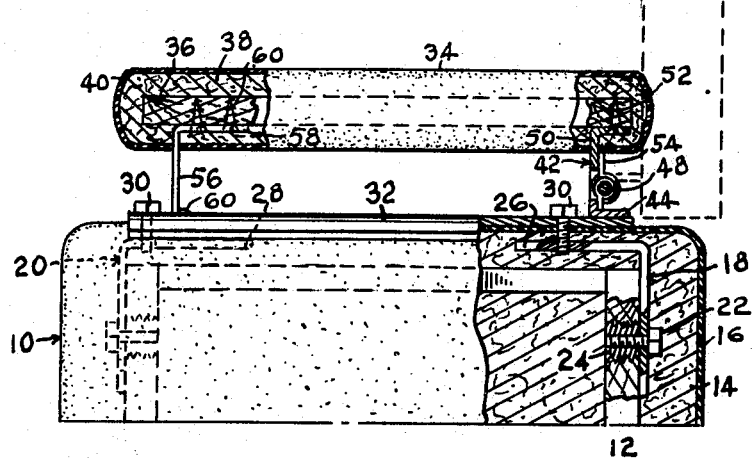
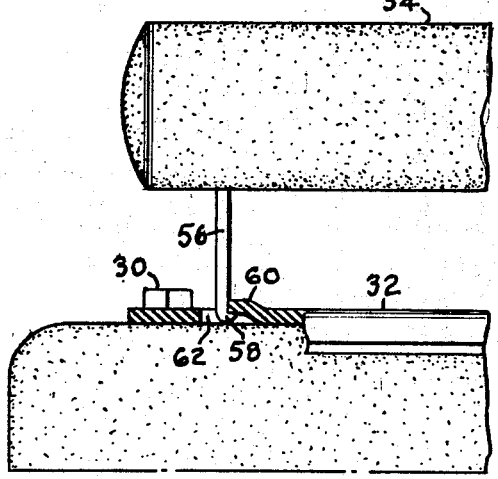
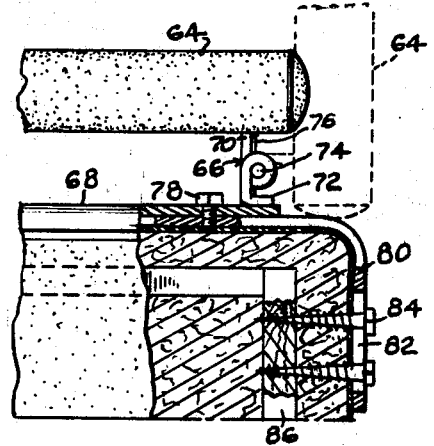
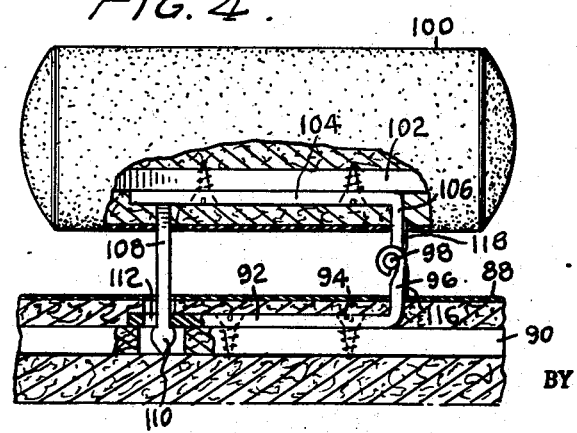
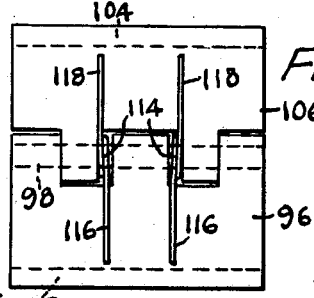
INVENTORS
James A. Coon
Elwin Theobald
BY Alexander B. Blair
ATTORNEY March 3, 1970    J. A. COON ET AL    3,498,671
MOVABLE HEADREST FOR VEHICLE SEATS
Filed Feb. 28, 1968    2 Sheets-Sheet 2
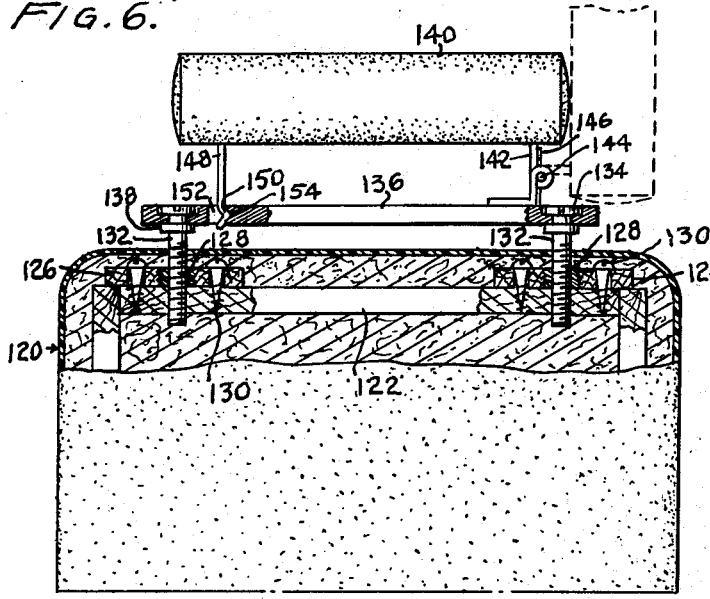
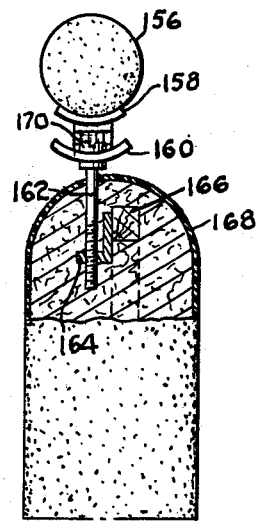
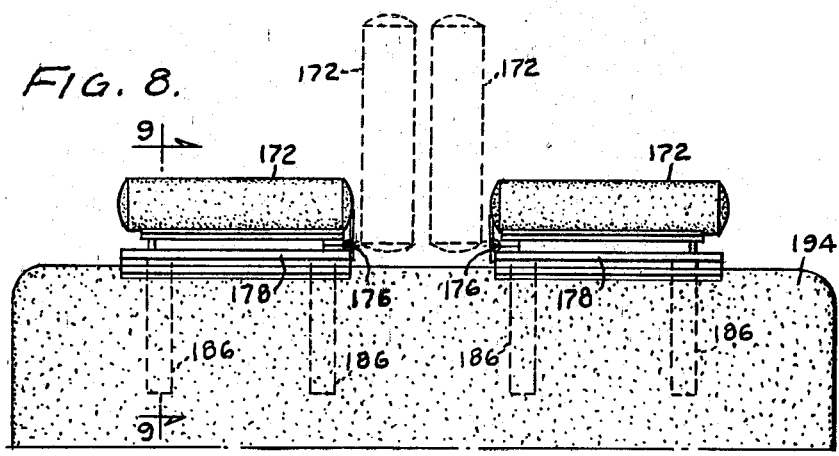
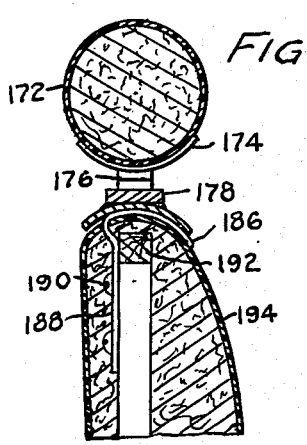
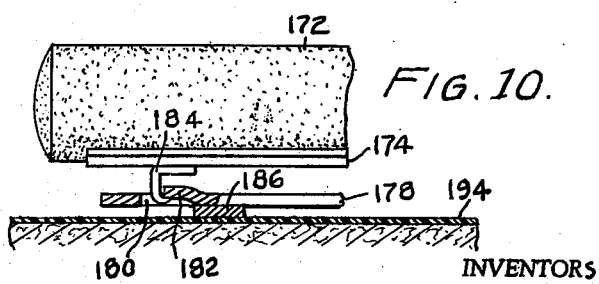
INVENTORS
James A. Coon
Elwin Theobald
BY
ATTORNEY

United States Patent Office 3,498,671
Patented Mar. 3, 1970

3,498,671
MOVABLE HEADREST FOR VEHICLE SEATS
James A. Coon, 929 Drever St., West Sacramento, Calif. 95691, and Elwin Theobald, 4631 Solano Way, Fair Oaks, Calif. 95628
Filed Feb. 28, 1968, Ser. No. 708,924
Int. Cl. A47c 7/38; B60n 1/02
U.S. Cl. 297—403    10 Claims

ABSTRACT OF THE DISCLOSURE

A headrest is arranged above the back of a vehicle seat to provide comfort and protection for the rider, and is pivoted at one end to swing upwardly to a vertical inoperative position to permit the rider, particularly in the front seat, to be able to reach over the back of the seat to pick up articles, attend to children, et cetera. A releasable latch holds the headrest in normal horizontal position and is so arranged beneath the headrest to prevent possible injury to anyone, and particularly children, riding in the back of the vehicle.

BACKGROUND OF THE INVENTION

One of the most serious injuries which can occur to a person riding in a motor vehicle is a neck injury, commonly known as "backlash," caused by the vehicle being struck from the rear by another vehicle. In common use at present is a headrest fixed in position above the top of the back of the front seat of the vehicle. With such a headrest, it is difficult to reach around over the back of the seat to pick up an article or to attend to children in the back seat.

It has been proposed in the prior art to hinge headrests of this type, but they usually swing downwardly and rearwardly and have exposed latch parts, metal straps, et cetera, in which a person, and particularly a child in the back seat, may catch or pinch his fingers or against which he may strike his head in the event of a sudden stop.

SUMMARY OF THE INVENTION

In one form of the invention a headrest is arranged over the top of the back of the front seat and pivoted beneath one end on a transverse horizontal axis to swing upwardly about such axis to an inoperative position. The other end of the headrest is latched in position to hold the headrest in a normal horizontal position. The pivoting and latching means carried by the back of the seat are anchored with respect to the interior frame of the seat. This form of the invention is used when the device is built in at the factory.

In another form of the invention, the device is intended to be installed after the manufacture of the vehicle and supporting parts for the device are anchored through the ends of the seat to the frame of the seat back.

In another form of the invention, the headrest has a support to which it is hinged and latched arranged above the back of the seat and so connected to the frame to provide for vertical adjustment of the headrest. There are other modifications in the invention involving the same broad principles.

BRIEF DESCRIPTION OF THE DRAWINGS

FIGURE 1 is a face view of the upper portion of the motor vehicle seat back showing one form of the invention, parts being shown in section;

FIGURE 2 is an enlarged fragmentary face view of one end of the construction, a portion of the latch means being shown in section;

FIGURE 3 is a fragmentary sectional view of the upper portion of one end of a seat back showing a form of the invention adapted to be installed after the vehicle has been manufactured;

FIGURE 4 is a fragmentary sectional view of a further modification showing a different type of latch device and mounting for the headrest;

FIGURE 5 is a face view of the hinge shown in FIGURE 4, embodying a spring feature, preferably common to all forms of the invention;

FIGURE 6 is an elevation similar to FIGURE 1 showing a modified form of the invention wherein the headrest is vertically adjustable, parts being broken away and parts being shown in section;

FIGURE 7 is a fragmentary end elevation of a modified form of vertically adjustable headrest;

FIGURE 8 is a face view of a further modification showing two headrests attached to the seat back;

FIGURE 9 is an enlarged sectional view on line 9—9 of FIGURE 8; and

FIGURE 10 is a fragmentary sectional view of the latch device of FIGURES 8 and 9, the headrest being shown in elevation.

DESCRIPTION OF THE PREFERRED EMBODIMENTS

Referring to FIGURE 1, the numeral 10 designates the back of a motor vehicle seat having an internal frame 12, padding 14, and a flexible cover 16 of any suitable material, for example, plastic. L-shaped brackets 18 and 20 have their vertical legs against the outer faces of the vertical portions of the frame 12 and screwed as at 22 into metal inserts 24 in the frame, if the latter is formed of wood. The horizontal ends 26 and 28 of the brackets 18 and 20, respectively, receive the lower ends of screws 30 for attaching thereto a longitudinal plate 32 seated on the top edge of the back of the seat.

A headrest 34 is arranged above and extends longitudinally of the seat back and is provided with an interior frame 36, padding 38, and flexible cover 40. A hinge 42 has a lower member 44 seating on and secured in any suitable manner to the plate 32. This hinge member is connected by a pin 48 to an upper hinge member 50 which may be attached by screws 52 to the frame 36. The hinge pin 48 has coiled therearound a spring 54 the ends of which respectively engage the hinge members 50 and 44 to bias the headrest to the horizontal position shown in FIGURE 1.

A vertical latch bar 56 has an upper horizontal end 58 attached by screws 60 to the frame 36. Referring to FIGURE 2, the latch bar 56 is provided at its lower end with a hook 58 having a round bottom and engageable beneath a struck up lip 60 formed by punching the plate 32 to form an opening 62 through which the hook 58 projects.

The form of the invention just described is adapted for installation at the vehicle factory. In FIGURE 3 a modified form of the invention is adapted to be installed by the vehicle owner. In this case the headrest 64 is hinged as at 66 to a plate 68 extending longitudinally along the top edge of the vehicle seat. The hinge comprises upper and lower elements 70 and 72 connected by hinge pin 74 surrounded by one or more springs 76, the ends of which engage its respective spring elements to bias the headrest 64 to a horizontal position.

The plate 68 is secured by screws 78 to the upper arm of an "L" shaped bracket 80, the vertical arm of which is slotted as at 82 to receive screws 84 for attaching the bracket 80 to the frame 86 of the seat back. The slot 82 provides for vertical adjustment of the parts of the device.

In FIGURE 4 there is shown another modification intended for installation at the factory. In this case, the seat back 88 has a frame 90 against the upper face of which is attached a plate 92 by screws 94. One end of the plate 92 is turned upwardly as at 96 to form one element of a hinge having a hinge pin 98.

The headrest 100 in this case is provided with a frame 102 to the bottom of which is secured a plate 104 having one end turned downwardly as at 106 and having its lower end forming the other element of the hinge bent around the pin 98.

The other end of the plate 104 is provided with a depending latch bar 108, the lower end of which is provided with an enlarged tapered or curved head 110 adapted to be inserted through an opening 112 in the plate 92 and engageable with one end thereof to latch the headrest in normal horizontal position. Other elements of the seat are provided with openings through which the lower end of the latch bar 108 extends, as will be obvious.

As previously described, the foregoing forms of the invention as well as those to be described are spring biased to horizontal operative position, and a spring means for this purpose is shown in FIGURE 5, illustrating the hinge construction in FIGURE 4. Two torsion springs 114 are coiled around the hinge pin 98 and are provided with lower and upper ends 116 and 118, respectively, engaging the hinge elements 96 and 106. These springs perform no function when the headrest is in normal horizontal position, but when the headrest is raised, for example to the dotted line position shown in FIGURE 1, the springs bias the headrest downwardly to assure its return to normal position without attention on the part of the operator.

Further modifications of the invention are shown in FIGURES 6 and 7, and these forms of the invention provide for the adjustment of the headrest as to height. Referring to FIGURE 6, the seat back 120 is provided with an interior frame 122, against the top of which may be arranged a pair of the plate members 124 and 126. These plate members may be made of wood provided with metal inserts 128, or they may be made of metal as desired and may be attached to the frame 122 by screws 130.

The metal inserts 128 receive the threaded ends of screws 132, the upper ends of which are provided with heads 134, recessed into a plate 136 extending longitudinally of the seat back. After the screws are placed in position in the plate 136, they may have washers 138 welded thereto to fix the positions of the screws 132 relative to plate 136.

A headrest 140 is arranged above the plate 136 and is connected by a hinge 142 to plate 136, the hinge including a hinge pin 144 carrying one or more springs 146 similar to the springs 114. The hinge 142 is arranged adjacent one end of the headrest and near its other end, the headrest carries a depending latch bar 148, the lower end of which is provided with an angular offset 150 adapted to extend to an opening 152 in the plate 136 to engage in a notch 154 to hold the headrest in its normal position.

Another type of vertically adjustable headrest is shown in FIGURE 7. In this case the headrest 156 is provided therebeneath with plate 158 suitably hinged and latched to a plate 160 carrying depending screws 162 threaded at their lower ends in brackets 164 carried by the frame 166 of the seat back 168. The screws 162 are provided with heads 170 above the plate 160 and with fixed flanges or washers beneath the plate 160.

A further modified headrest construction is shown in FIGURES 8, 9 and 10, and the headrests are duplicated in FIGURE 8. Each of these headrests is identical with the other and includes a headrest unit 172 secured to a plate 174 hinged at one end as at 176 to a plate 178 extending longitudinally of the seat back thereabove. The end of each plate 178 opposite the hinge is provided with an opening 180, one end of which is struck up as at 182 to provide a lip engageable with the hooked lower end of a latch element 184 carried by the headrest 172. Each plate 178 is supported on the adjacent ends of straps 186 having depending ends 188 attached as at 190 to the frame 192 of the seat back 194.

OPERATION

The headrest in each case is shown in solid lines in its normal horizontal position, and in each case the headrest is pivoted to swing upward at its free end to assume an inoperative vertical position as shown in dotted lines in FIGURES 1, 3, 6 and 8. In FIGURES 1 and 2, the latch may be released by pressing downwardly slightly on the center of the headrest 34 and upwardly on the latched end of the headrest. The hook 58 thus will be released and the headrest swung to vertical position so that the rider may freely reach over the back of the seat for any desired purpose. When the headrest is released, the spring or springs 54 will swing the headrest downwardly and it will snap into latched position. In FIGURE 4 the curved upper portion of the latch head 110 will slide over the end wall of the opening 112 upon exertion of an upward force on the latched end of the headrest. The same is true of the construction shown in FIGURE 6, it being merely necessary to exert an upward force on the free end of the headrest 140, and upon return movement, the angular offset 150 will cam the latch bar 148 to the left so that it will snap back to latched position. The latch in FIGURE 10 is operated in the same manner as the latch in FIGURE 2.

The forms of the invention in FIGURES 1, 4, 6, 7 and 9 are intended to be installed at the factory, while the form of the invention in FIGURE 3 may be installed by the owner after purchasing the car.

It will be noted that there are no straps or intricate hinge or latch elements in which a child in the back seat may catch his fingers or against which he might strike his head if thrown forwardly by the sudden stopping of the vehicle. Metal straps extending behind the back of the front seat can be dangerous in the latter case. Thus the device is inherently safe in use and protects against so-called "backlash" injuries, due to a vehicle being struck from the rear.

If desired due to varying heights of riders, the forms of the invention in FIGURES 3, 6 and 7 may be vertically adjusted. The screws 132 or 162 may be turned to adjust the height of the headrest, as will be apparent.

From the foregoing it will now be seen that there is herein provided an improved movable headrest for vehicle seats which accomplishes all of the objects of this invention and others, including many advantages of great practical utility and commercial importance.

As various embodiments may be made of this inventive concept, and as many modifications may be made in the embodiment hereinbefore shown and described, it is to be understood that all matter herein is to be interpreted merely as illustrative, and not in a limiting sense.

We claim:
1. A headrest mounting for the top of the back of an automobile seat comprising a padded headrest, hinge means connecting the headrest to the back of the seat for swinging movements about a horizontal axis transverse to the length of the headrest, between a horizontal position over the back of the seat and an upwardly extending inoperative position, and latch means between said headrest and the seat for latching the headrest in normal horizontal position.

2. A device according to claim 1 wherein said latch means comprises a pair of elements one of which is fixed to the top of the back of the seat and the other of which is connected to said headrest.

3. A device according to claim 1 provided with a bar extending longitudinally of and secured to the seat back and to one end of which said hinge means is connected, said headrest being elongated parallel to the seat back and said hinge being connected to said headrest adjacent one end thereof, said latch means comprising a latch element carried by said headrest adjacent the other end thereof, and a latch-engaging element carrried by said bar.

4. A device according to claim 1 provided with resilient means biasing said headrest to a normal horizontal position.

5. A device according to claim 1 wherein said latch means comprises a plate extending longitudinally of and secured to the back of the seat and provided with a latch engaging element, a bar carried by and extending longitudinally of said headrest and to one end of which said hinge means is connected, and a latch having connection with said bar adjacent the other end of said headrest, said plate having a latch engaging element engageable with said latch to hold said headrest in normal horizontal position.

6. A device according to claim 1 wherein said seat back is provided with an interior frame, a bar carried by said frame, said hinge means being connected between said bar and said headrest adjacent one end of the latter, and a latch element carried by said headrest adjacent the other end thereof and engaging a portion of said bar to latch said headrest in normal horizontal position.

7. A device according to claim 6 wherein said bar is concealed within said seat back, the upper end of said seat back having openings through which said hinge means and said latch device respectively project.

8. A device according to claim 6 wherein said bar is arranged above said seat back, and means connecting said bar to said frame for vertical adjustment relative thereto to adjust the height of said headrest above the seat back.

9. A device according to claim 6 wherein said headrest is provided with an interior frame, a second bar within said headrest fixed to such frame, said second bar being provided adjacent one end with a depending element forming part of said hinge means, said latch device being carried by said second bar adjacent the other end thereof.

10. A device according to claim 6 wherein said hinge means comprises a hinge pin, and a torsion spring surrounding said hinge pin and having ends exerting forces against said headrest and said seat back to bias said headrest to a normal horizontal position.

References Cited

UNITED STATES PATENTS

| | | | |
|---|---|---|---|
| 1,420,924 | 6/1922 | Hogan | 297—416 |
| 2,592,702 | 4/1952 | Sprung | 297—417 |
| 3,304,120 | 2/1967 | Cramer | 297—403 |
| 3,369,786 | 2/1968 | Schloemer | 297—410 X |

CASMIR A. NUNBERG, Primary Examiner

U.S. Cl. X.R.

297—397